(12) United States Patent
Leutgeb et al.

(10) Patent No.: US 8,144,017 B1
(45) Date of Patent: Mar. 27, 2012

(54) TRANSPONDER AND METHOD FOR OPERATING A TRANSPONDER

(75) Inventors: Thomas Leutgeb, Lieboch (AT); Josef Haid, Graz (AT); Walter Kargl, Graz (AT); Josef Riegebauer, Ilz (AT); Thomas Baglin, Graz (AT); Albert Missoni, Graz (AT); Dietmar Scheiblhofer, Kaindorf (AT); Bernd Zimek, Graz (AT); Friedrich Skofitsch, Graz (AT); Markus Unterlercher, Graz (AT); Robert Hofer, Graz (AT)

(73) Assignee: Infineon Technologies AG, Neubiberg (DE)

( * ) Notice: Subject to any disclaimer, the term of this patent is extended or adjusted under 35 U.S.C. 154(b) by 1071 days.

(21) Appl. No.: 12/034,967

(22) Filed: Feb. 21, 2008

(51) Int. Cl.
*G08B 13/14* (2006.01)
(52) U.S. Cl. ............... 340/572.3; 340/572.2; 340/572.4; 340/539.21
(58) Field of Classification Search .................. 340/551, 340/572.1–572.7, 10.1, 10.3, 539.11, 539.21; 235/381–385; 455/275, 277.1, 421, 422.1, 455/130; 345/179, 173
See application file for complete search history.

(56) References Cited

U.S. PATENT DOCUMENTS

| | | | | |
|---|---|---|---|---|
| 6,819,221 | B1 * | 11/2004 | Amtmann et al. | 340/10.3 |
| 7,151,436 | B2 * | 12/2006 | Fischer et al. | 340/10.1 |
| 7,437,132 | B2 * | 10/2008 | Hanabusa et al. | 455/130 |
| 7,474,300 | B2 * | 1/2009 | Katsurahira et al. | 345/179 |

* cited by examiner

*Primary Examiner* — Van T. Trieu
(74) *Attorney, Agent, or Firm* — Dickstein Shapiro LLP (57) ABSTRACT

An RFID transponder having an adjustable response field strength including a determination circuit formed to determine a quantity which is derivable from a field strength of an electromagnetic field prevailing at the location of the RFID transponder, a comparator formed to compare the determined quantity derived from the field strength with a threshold value, wherein the threshold value is based on the adjustable response field strength, which is higher than the minimum field strength required for the operation of the RFID transponder, and a deactivator formed to deactivate a functionality of the RFID transponder if the derived quantity falls below the threshold value.

27 Claims, 5 Drawing Sheets

TRANSPONDER AND METHOD FOR OPERATING A TRANSPONDER

BACKGROUND

Embodiments of the present invention relate to transponders (made up of transmitter and responder) and methods for operating transponders which may be applied in the so-called RFID technology (RFID=radio frequency identification), for example.

RFID technology is a radio-based contactless identification method. A RFID system typically includes one or several reader devices and a plurality of transponders. Both the reader device and the transponder each comprise an antenna which critically influences a coverage of data communication between the reader device and the transponder. If the transponder comes near the antenna of the reader device, both of them (transponder and reader device) exchange data. Apart from the data, the reader device transmits energy to the transponder. An antenna coil embodied as a frame- or ferrite-antenna, for example, is located in the transponder. For operating the transponder, the reader device generates an electromagnetic alternating field by means of its antenna.

The antenna of the reader device also includes a coil with several windings. If the transponder is brought sufficiently near to the antenna of the reader device, the electromagnetic field of the reader device will generate an induction voltage in the coil of the transponder. This induction voltage may be rectified and limited and serves for voltage supply of the transponder or a load circuit located in the transponder, such as a microcontroller. From the (alternating) induction voltage induced in the transponder, a clock frequency for the load circuit may be additionally derived, which is then available as a system clock for the load circuit in form of a memory chip or a microprocessor.

If the transponder is sufficiently near to the reader device, a minimum field strength required for the operation of the transponder will be exceeded, which in the following is referred to as "response field strength". The response field strength of the transponder depends upon the energy consumption of the load circuit integrated in the transponder and the properties of the transponder antenna, such as antenna gain or resonance frequency. If the response field strength is exceeded, the transponder will start operating, receive data transmitted from the reader device and perform e.g. an amplitude modulation of the electromagnetic field reflected by its antenna according to the data to be transmitted by the transponder. The reflected electromagnetic field may be received by the antenna of the reader device and then be evaluated in the reader device with regard to the data modulated upon.

As has been previously described, the response field strength of a transponder depends, among other things, upon energy consumption of an integrated circuit, or a load circuit of the transponder. There my be cases in which it is not desirable to achieve a response field strength as low as possible, but rather, in contrast, in which it is strived for a transponder to communicate with the reader device only from a certain predetermined field strength of an electromagnetic field prevailing at the location of the transponder and not below.

SUMMARY

Embodiments of the present invention provide a transponder with a determination circuit formed to determine a quantity which is derivable from a field strength of an electromagnetic field prevailing at a location of the transponder, a comparator formed to compare the determined quantity derived from the field strength with a threshold value, and a deactivator formed to deactivate a functionality of the transponder if the quantity derived falls below the threshold value.

BRIEF DESCRIPTION OF THE DRAWINGS

Embodiments of the present invention will be detailed subsequently referring to the appended drawings, in which.

DETAILED DESCRIPTION

With respect to the following description, it should be noted that in the different embodiments, same functional elements or functional elements acting in the same way have same reference numerals, and, thus, descriptions of these functional elements in the different embodiments illustrated in the following are interchangeable.

In the following, the term "signal" is used equally for currents or voltages, unless explicitly stated otherwise.

Figure 1:
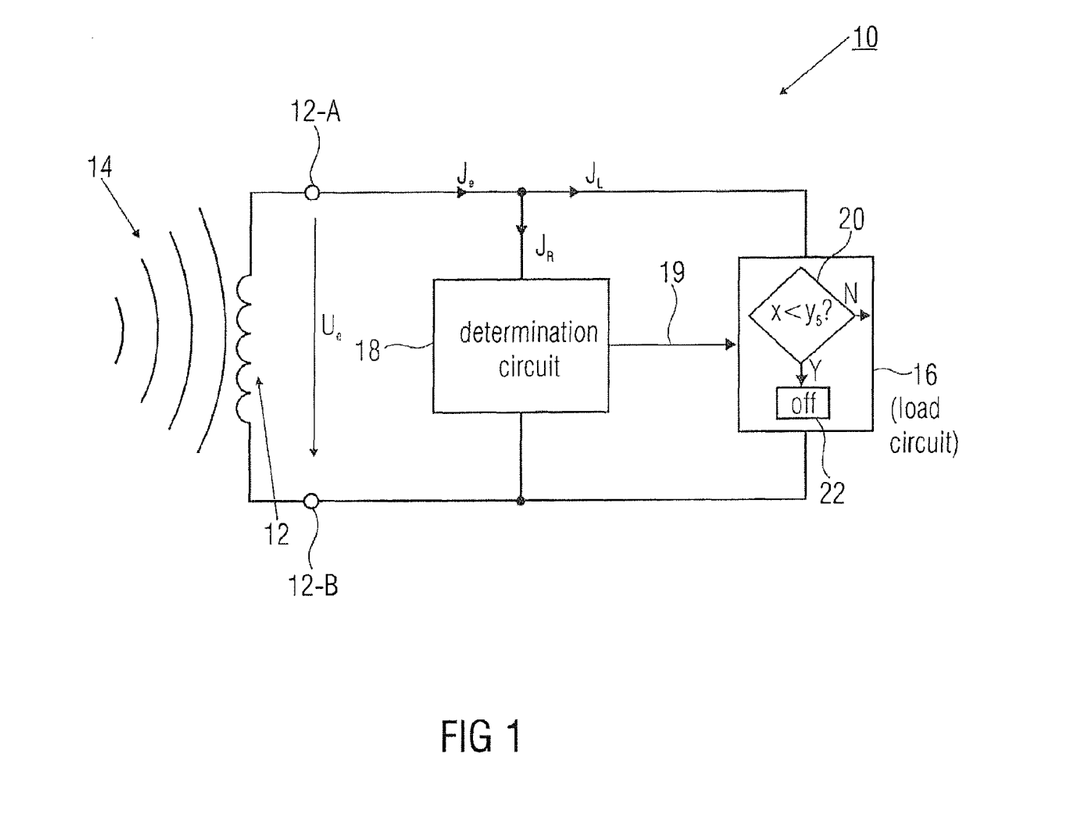
FIG. 1 shows a block diagram of a transponder according to an embodiment of the present invention.

FIG. 1 shows a schematic circuitry of a transponder 10 according to an embodiment of the present invention.

Transponder 10 comprises an antenna coil 12 at terminals 12-A, 12-B at which a voltage $U_e$ may be induced by an electromagnetic field 14 prevailing at a location of the transponder 10. Transponder 10 further comprises a load circuit 16, e.g. in the form of an integrated circuit, connected between the terminals 12-A, 12-B. In the embodiment shown in FIG. 1, a determination circuit 18 of transponder 10 is connected in parallel to load circuit 16 to determine a quantity 19 which is derivable from a field strength of the electromagnetic field 14 prevailing at the location of transponder 10. Transponder 10 further includes a comparator 20 to compare the determined quantity 19 derived from the field strength to a threshold value. In this context, the comparator 20 may be part of the integrated load circuit 16 comprising a CPU (Central Processing Unit), for example, as shown by way of example in FIG. 1. Comparator 20 is coupled to a deactivator 22 to deactivate or change a functionality of the transponder 10, such as a data communication functionality or functionalities of parts of the CPU related to the data communication, if the derived quantity 19 falls below the threshold value, depending on the comparison result. Thereby the data communication functionality or functionalities of parts of the CPU related to the data communication may be changed or (de)activated responsive to a signal comprising a bit-sequence and/or interrupt and/or reset information.

E.g., a data communication protocol used by transponder 20 may be changed or (de)activated depending on a field strength of the electromagnetic field 14 prevailing at the location of transponder 10, such that e.g. a first communication protocol is used if quantity 19 falls below the threshold value and a second communication protocol is used if quantity 19 exceeds the threshold value. Also, any data communication may be completely suspended if quantity 19 falls below the threshold value.

According to embodiments, quantity 19 derived from the field strength may be, for example, a clock frequency $f_{CLK}$ for load circuit 16, an electric conductance of load circuit 16 or current not consumed by load circuit 16. Of course, quantities derived from these quantities, such as digitalized values, are also conceivable.

In a load circuit 16 with clocked circuit parts, a clock frequency $f_{CLK}$ influences power consumption of the load circuit 16 since the power consumption of clocked circuit parts is proportional to the clock frequency $f_{CLK}$. In a conventional load circuit 16 in a transponder, the clock frequency $f_{CLK}$ is usually fixedly predetermined. The disadvantage to this is that it is thereby not possible to react to changing energetic conditions. If provided energy decreases such that the current required for the operation of the load circuit 16 is not provided anymore, this will lead to a supply voltage drop. Changing energetic conditions occur, for example, in a transponder used in a contactless chip card whose energy supply is performed via electromagnetic field 14 whose strength may fluctuate.

Therefore, in some embodiments of the present invention, determination circuit 18 is adapted to determine and adjust a clock frequency $f_{CLK}$ of a clock signal that depends upon the field strength of the electromagnetic field 14 prevailing at the location of the transponder. Via the clock frequency $f_{CLK}$, the electric power consumption of load circuit 16 may then in turn be adjusted depending upon the energy made available from electromagnetic field 14.

Energy is provided to transponder 10 by electromagnetic field 14 by means of coil 12. The induced voltage $U_e$ is generally limited by a voltage limiting circuit to a supply voltage $V_{DD}$ suitable for operation of load circuit 16. In the case of sufficiently high energy provided by electromagnetic field 14, the energy provided is not completely consumed by load circuit 16. For its operation, load circuit 16 needs only a part of the whole energy provided. The part needed depends upon the supply voltage $V_{DD}$, the clock frequency $f_{CLK}$ as well as the energy demand of the active circuit parts within load circuit 16. For example, if a circuit part within load circuit 16 is activated, load circuit 16 will draw more current, which is accompanied by an increased energy demand.

According to embodiments of the present invention, the clock frequency regulation of load circuit 16 is made depending upon a portion of the energy that is provided by electromagnetic field 14 and that is not needed for operation of load circuit 16. According to embodiments, determination circuit 18 for this purpose comprises a measurement circuit to detect a residual power signal depending upon the part of the energy provided via the electromagnetic field that is not needed by load circuit 16. The residual power signal detected may then be compared to a target quantity of the residual power. The detection of the residual power signal may, in one embodiment of the present invention, be performed by detecting a residual current $I_R$, by means of which power or energy not needed by load circuit 16 is drained off.

Figure 2:
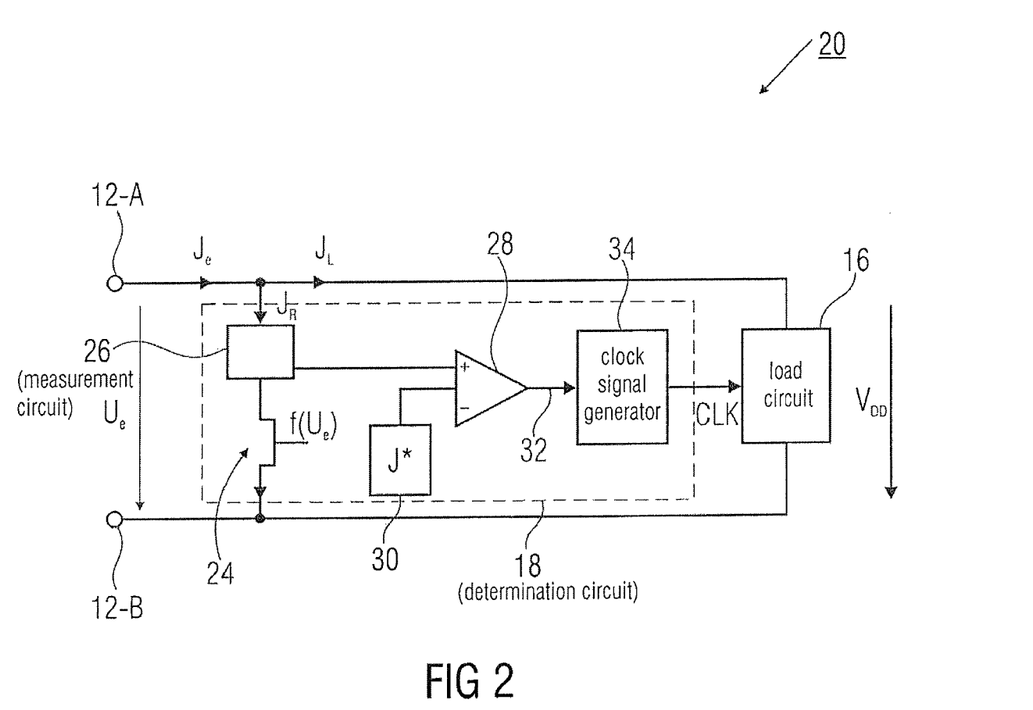
FIG. 2 shows a block diagram of a transponder with a variably clocked load circuit according to an embodiment of the present invention.

With respect to this, FIG. 2 shows a schematic illustration of an embodiment of a transponder 20, wherein determination means 18 is formed to a adjust a clock frequency $f_{CLK}$ of a clock signal depending upon the detected residual power signal, such as residual current $I_R$, for load circuit 16.

According to one embodiment, determination circuit 18 comprises a shunt 24 connected between terminals 12-A, 12-B. Via shunt 24, part of an input current $I_e$ present at terminal 12-A may conducted to terminal 12-B. A measurement circuit 26 which may measure the residual current $I_R$ conducted to terminal 12-B via shunt 24 precedes shunt 24. Further, a comparison assembly 28 as well as a register 30 may be provided in determination circuit 18. According to embodiments, measurement circuit 26 as well as register 30 are coupled to inputs of comparison assembly 28. At its output side, comparison assembly 28 provides a control signal 32 which may control a clock frequency $f_{CLK}$ of a clock signal CLK generated by a clock signal generator 34. Clock signal CLK is provided at an output of clock signal generator 34 and is fed to load circuit 16 to supply it with a system clock.

The part $I_R$ of the input current $I_e$ that is not needed by load circuit 16 is conducted to terminal 12-B via shunt 24. At the same time, shunt 24 limits the voltage $U_e$ present at the shunt to a supply voltage $V_{DD}$. Thereby, voltage spikes between terminals 12-A, 12-B may be avoided so as to protect following circuit parts.

The current strength of shunt current $I_R$ is detected by measurement circuit 26 and compared to a current target value stored in register 30. In embodiments of the present invention, this comparison may be performed digitally since measurement circuit 26 in embodiments provides a digital measurement value. However, also an analog execution of the comparison is conceivable, wherein analog currents, the measured residual current $I_R$ and a reference current are compared.

If the measured residual current $I_R$ is greater than the current target value, clock signal generator 34 may be controlled such that clock frequency $f_{CLK}$ of clock signal CLK is increased. Thereby, the current consumption of the clocked load circuit 16 increases so that the energy made available by electromagnetic field 14 may be better utilized. Consequently, current $I_R$ flowing through shunt 24 is in turn reduced. If current $I_R$ flowing through shunt 24 is smaller than the predetermined current target value, clock frequency $f_{CLK}$ of clock signal CLK may be reduced to reduce the current consumption of load circuit 16. In this way, voltage drops may be avoided. In embodiments, the comparison within comparison assembly 28 may also be performed with a first current target value checked for being exceeded by the residual current $I_R$ measured, and with a second current target value, wherein it is checked whether the residual current $I_R$ has fallen below the second current target value.

In embodiments, it is strived for a predetermined residual current $I_R$ defined by the current target value to drain off via shunt 24. In the case of deviations, clock frequency $f_{CLK}$ of clock signal CLK may be decreased or increased. Despite the sometimes fast changing electromagnetic field 14, also an averaging of clock frequency $f_{CLK}$ may be enabled by inertia of shunt 24.

In a simple design, shunt 24 may include a regulated transistor whose gate voltage is controlled such that the drain-source voltage $U_e$ across shunt transistor 24 is regulated. The goal of this regulation is for the voltage across shunt 24 not to exceed a predetermined value. Of course, the design of shunt 24 may be made more large-scale by further devices in further embodiments.

By means of the regulation described, clock frequency $f_{CLK}$ is nearly optimally adaptable to the energy made available by electromagnetic field 14. A clock suppressor suppressing parts of clock signal CLK is not necessarily required but may, however, be provided for fine adjustment of the effective clock frequency $f_{CLK}$, so as to react to fast load alterations, for example. For example, this is the case if a further clock frequency-dependent load is put into operation within load circuit 16.

The automatic frequency scaling described in the foregoing adjusts clock frequency $f_{CLK}$ of the integrated load circuit 16 to the power available from electromagnetic field 14. Thus, the adjusted clock frequency $f_{CLK}$ is a measure of the electromagnetic field strength, which, in many cases, cannot be measured directly. That is, a currently adjusted clock frequency $f_{CLK}$ and an associated evaluation allow to conclude the electromagnetic field strength currently prevailing at the location of transponder 20. According to this embodiment, the adjusted clock frequency $f_{CLK}$ is thus the quantity 19 that is derivable from the field strength prevailing at the location of the transponder.

The current $I_L$ consumed by load circuit 16 depends upon clock frequency $f_{CLK}$, i.e. $I_L = I_L(f_{CLK})$. For example, $I_L(f_{CLK})$ might be calculated according the formula $$I_L(f_{CLK}) = (\Delta I_L / \Delta f_{CLK})^* f_{CLK} + I_{L,off} + I_S, \qquad \text{a.}$$

wherein $(\Delta I_L / \Delta f_{CLK})$ denotes a load current slope, i.e. a change of the load current $I_L$ divided by the corresponding change of the clock frequency $f_{CLK}$, $I_{L,off}$ denotes an offset current and $I_S$ denotes a shunt current. Typical values for $\Delta I_L / \Delta f_{CLK}$ may lie in a range 10 µA/MHz $< \Delta I_L / \Delta f_{CLK} <$ 1 mA/MHz. Typical values for $I_{L,off}$ may lie in a range 0.1 mA $< I_{L,off} <$ 2 mA, and typical values for $I_S$ may lie in a range 0.5 mA $< I_S <$ 30 mA. If a clock frequency $f_{CLK} =$ 20 MHz is adjusted, for example, a current consumption of transponder 20, or load circuit 16, may thereby be concluded. E.g., assuming that $(\Delta I_L / \Delta f_{CLK}) =$ 100 µA, $I_{L,off}$ 0.5 mA and $I_S =$ 2 mA, $I_L$(20 MHz)=4.5 mA. Knowing a transponder configuration (antenna, effectivity of rectifier, . . . ), the field strength of electromagnetic field 14 may be concluded. Thereby, an indirect measurement of the electromagnetic field strength at the location of transponder 20 is possible.

Thus, it is possible, for example, to activate or change a data communication or CPU function of transponder 20 only from a predetermined response field strength. In this context, the predetermined response field strength is in embodiments characterized by an adjusted clock frequency $f_{CLK}$ corresponding to the predetermined response field strength. That is, the predetermined response field strength of transponder 20 corresponds to a threshold value which may be compared to a currently adjusted clock frequency $f_{CLK}$, for example. In embodiments of the present invention, if the currently adjusted clock frequency $f_{CLK}$ falls below the threshold value, data communication functionality of transponder 20, such as a transmitting or modulation functionality, may be changed, limited, or completely put to a stop, so that communication with a reader device is changed or not possible at all. In embodiments of the present invention, if the currently adjusted clock frequency $f_{CLK}$ exceeds the predetermined threshold value, that is, the prevailing field strength exceeds the predetermined response field strength of transponder 20, data communication or CPU functionality of transponder 20, such as a transmitting functionality, may be activated. If the currently adjusted clock frequency $f_{CLK}$ is identical with the threshold value, the data communication or CPU functionality may be either activated or deactivated.

Figure 3:
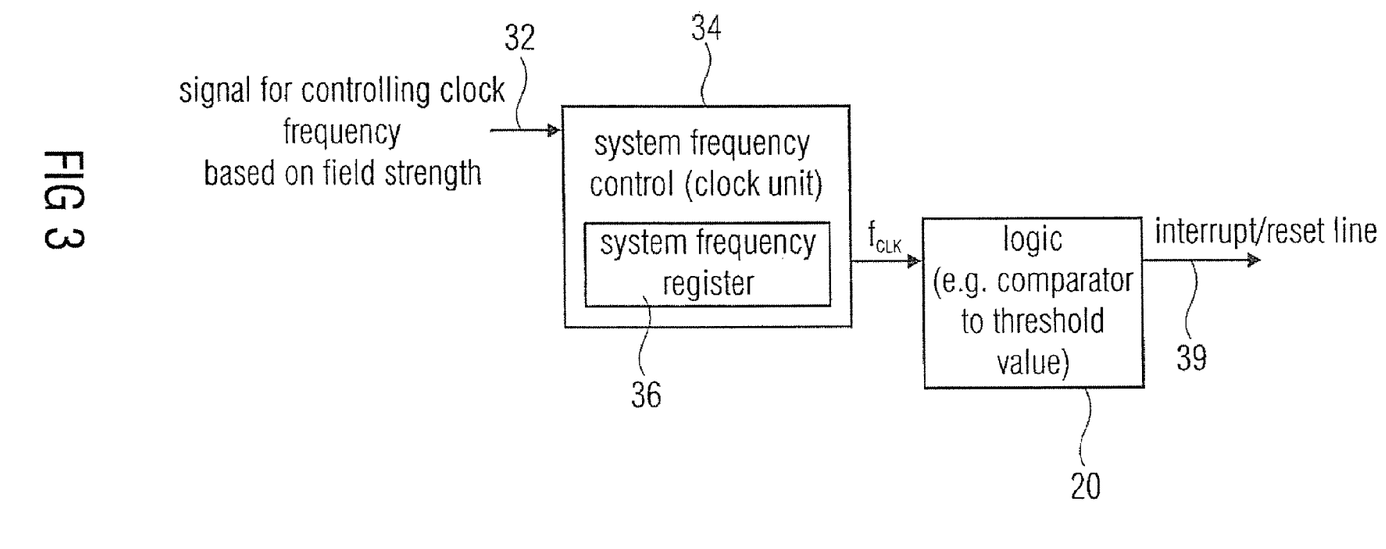
FIG. 3 shows a block diagram of a determination circuit coupled to a comparator according to an embodiment of the present invention.

The comparison with the threshold value is graphically illustrated by example of FIG. 3.

FIG. 3 shows clock signal generator 34 whose clock frequency $f_{CLK}$ may be controlled by signal 32. From a frequency register 36 of clock signal generator 34, the clock frequency $f_{CLK}$ or a value derivable therefrom may be read out and output to a comparison circuit 20 comparing the current clock frequency $f_{CLK}$ or the value derived therefrom with a threshold value. In the case of falling below the threshold value, comparison circuit 20 outputs a signal 39 which may cause a change or deactivation of data communication functionality of transponder 20. In the case of exceeding the threshold value, signal 39 may cause an activation of the corresponding data communication functionality. According to some embodiments of the present invention signal 39 may be e.g. bit-sequence or a processing interrupt, i.e. an asynchronous signal indicating a need for attention or a synchronous event in software indicating a need for a change in execution of a program flow. Further, signal 39 could be a reset signal for a microcontroller or CPU.

In embodiments of the present invention, the threshold value is programmable so that the threshold value may be adjusted according to a desired response field strength by prior calibration of transponder 20, for example. When calibrating, different electromagnetic field strengths may be associated with different clock frequencies.

As has been already mentioned, quantity 19 that is derivable from the field strength may also be an electrical conductance of load circuit 16, for example. According to further embodiments, determination circuit 18 is adjusted for this purpose to determine and adjust electrical conductance of load circuit 16 that depends upon the field strength of electromagnetic field 14 prevailing at the location of transponder 10. Via the electrical conductance, the electric power consumption of load circuit 16 may then in turn be adjusted depending upon the energy made available from electromagnetic field 14.

Figure 4:
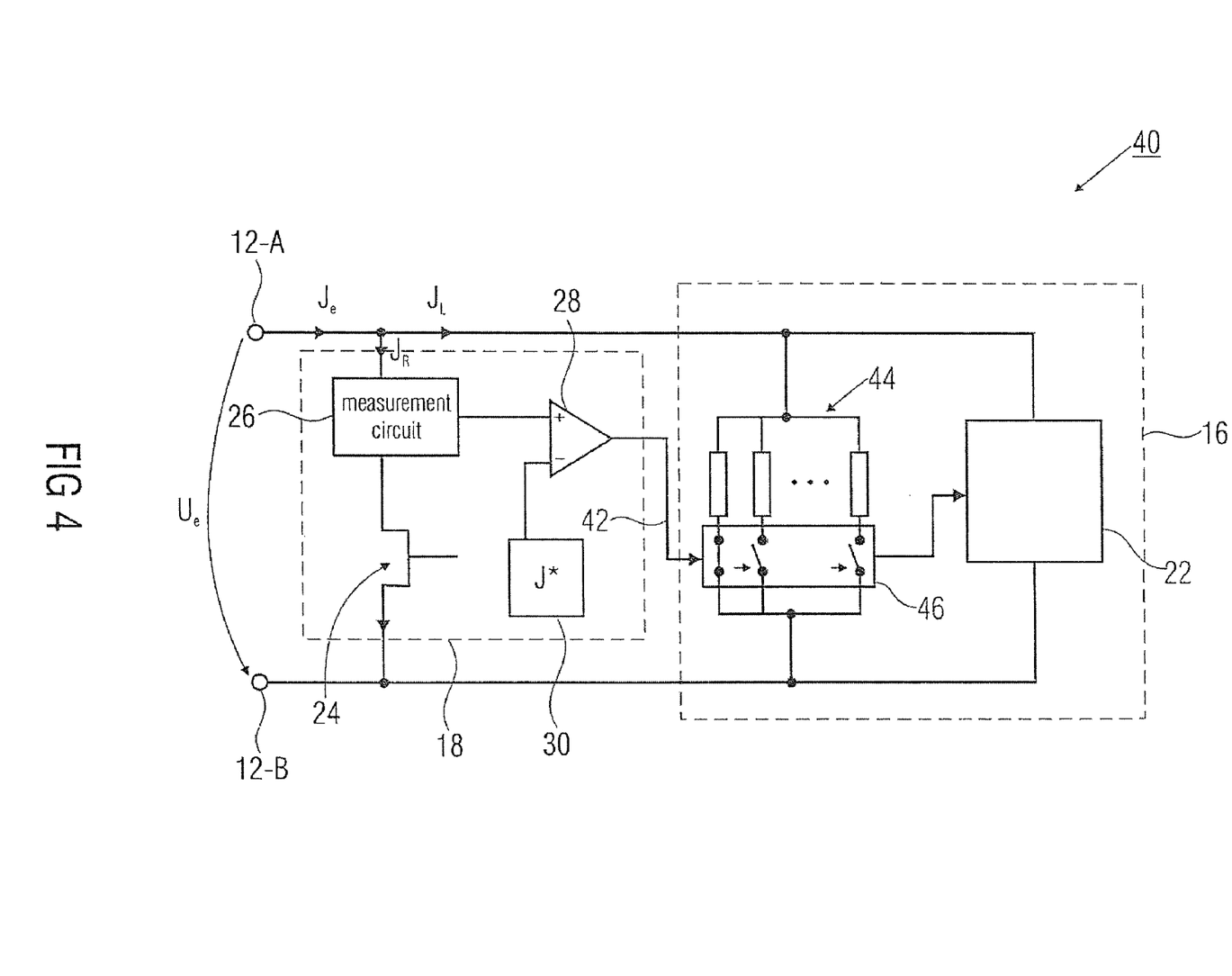
FIG. 4 shows a schematic circuitry of a transponder with an electrical conductance of the load circuit that is adjustable depending upon a field strength, according to an embodiment of the present invention.

With respect to this, FIG. 4 shows a further embodiment of a transponder circuit 40 according to the present invention.

Part of the input current $I_e$ present at input 12-A may drain off to terminal 12-B via shunt 24. Measurement circuit 26 which may measure the current $I_R$ flowing through shunt 24 precedes shunt 24. As in the embodiment explained referring to FIG. 2, determination circuit 18 here comprises a comparison assembly 28 as well as a register 30. Measurement circuit 26 as well as register 30 are coupled to inputs of comparison assembly 28. At its output, comparison assembly 28 provides a control signal 42 which may control, or adjust, electrical conductance of load circuit 16. In this context, the electrical conductance may be adjusted e.g. by a resistor network 44 with resistors that are switchable by switches 46. The resistors switchable by switches 46 may be realized by transistors, for example.

The part $I_R$ of the input current $I_e$ that is not needed drains off via shunt 24. At the same time, shunt 24 limits the voltage $U_e$ present at shunt 24. Thereby, voltage spikes are avoided so as to protect following circuit parts of the transponder 40. The current strength of residual current $I_R$ is detected by measurement circuit 26 and compared to a current target value stored in register 30. This comparison may be made digitally since measurement circuit 26 provides a digital measurement value in an embodiment. An analog execution of the comparison, however, is also conceivable, wherein analog currents, the measured one and a reference current, are compared.

If the measured residual current $I_R$ is greater than the current target value, switches 46 of the switchable resistor network 44 may be switched such that the conductance of load circuit 16 is increased. Thereby, the current consumption $I_L$ of load circuit 16 increases so that the energy provided by electromagnetic field 14 is largely consumed by load circuit 16. Consequently, also current $I_R$ flowing through shunt 24 is reduced. If current $I_R$ flowing through shunt 24 is smaller than the predetermined current target value, the electrical conductance of load circuit 16 may be reduced so as to reduce current consumption of the load circuit 16. In this way, voltage drops may be avoided.

The comparison within comparison assembly 28 may also be performed with a first current target value checked for being exceeded by the measured current $I_R$, and with a second current target value, wherein it is checked whether current $I_R$ falls below it.

It is strived for a predetermined current $I_R$ predetermined by the current target value to drain off through shunt 24. In the case of deviations, the electrical conductance of load circuit 16 may be decreased or increased. By means of the regulation described the electrical conductance of load circuit 16 is nearly optimally adaptable to the energy provided.

In the embodiment described in the foregoing, the electrical conductance adjusted by switchable resistor network 44 represents quantity 19 which is derivable from the field strength prevailing at the location of the transponder. The number of closed switches 46 might as well be understood as the derivable quantity 19. This quantity 19 derived from the field strength may be set, similar to clock frequency $f_{CLK}$ in relation to the field strength prevailing at the location of the transponder by a calibration, for example, whereby this field strength may be indirectly measured, as has already been described in the foregoing. By a threshold value that may be compared to the electric conductance or the number of closed switches 46, a predetermined response field strength which may be associated with the threshold value and from which a data communication or CPU functionality of the transponder is changed or activated may be adjusted. This may be made analogously to the procedure described referring to FIGS. 2 and 3.

According to further embodiments, quantity 19 derived from the field strength may be a current $I_R$ not consumed by a load circuit 16 clocked with a constant clock frequency.

Figure 5:
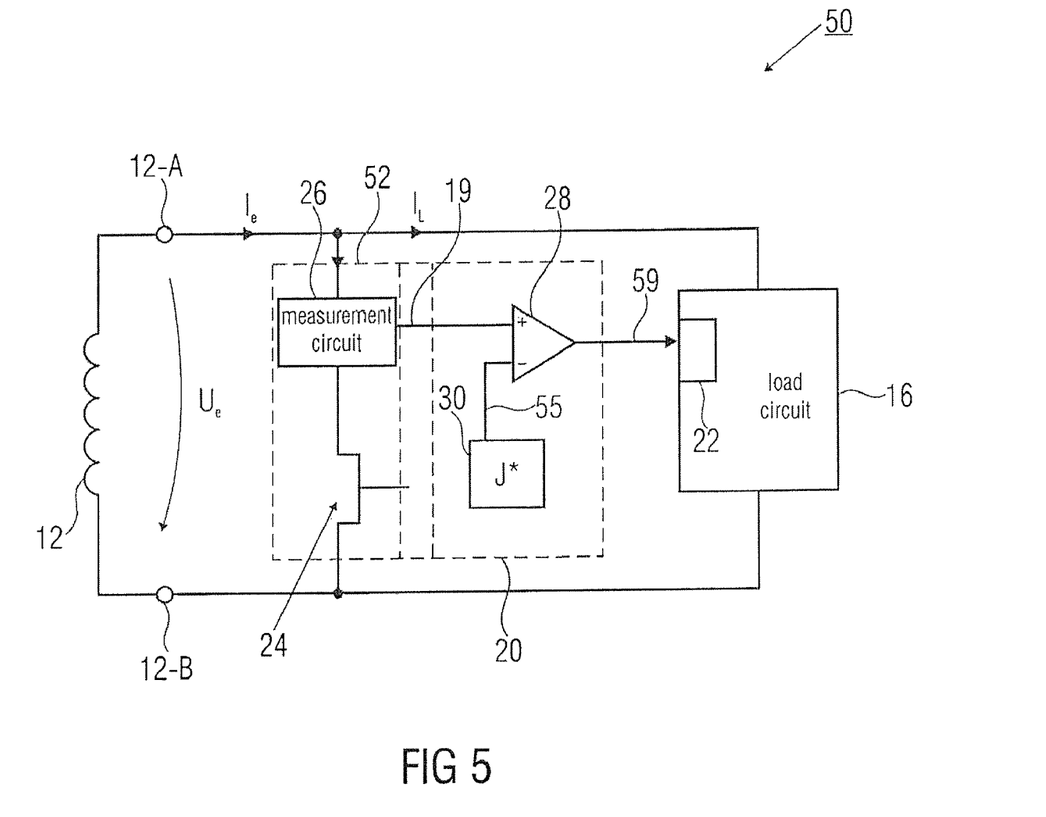
FIG. 5 shows a schematic circuitry of a transponder with a response field strength which may be predetermined, according to a further embodiment of the present invention.

With respect to this, FIG. 5 schematically shows a transponder circuit 50 according to a further embodiment of the present invention.

In the embodiment shown in FIG. 5, the derivable quantity corresponds to the residual current $I_R$ or to a value derived therefrom, such as a digital value. The load circuit 16 of the embodiment shown in FIG. 5 that is clocked with a constant clock frequency comprises an electrical power consumption which is largely independent of the energy provided. That is, also the current $I_L$ made available for load circuit 16 is largely independent of the energy provided from electromagnetic field 14. Consequently, the residual current $I_R$ draining off via shunt 24 is a measure of the energy provided from electromagnetic field 14. If the field strength of the electromagnetic field 14 exceeds the minimum field strength required for the operation of the load circuit 16, that is, if not all energy provided is consumed by load circuit 16, part of the energy provided drains off via shunt 24 in form of current $I_R$, as has already been described in detail in the foregoing.

Thus, in this embodiment, a field strength prevailing at the location of transponder 50 may be concluded from current $I_R$. If the predetermined or desired response field strength of transponder 50 is to be over the minimum field strength needed for operation of load circuit 16, this may be adjusted by a current threshold value 55 in register 30 that is associated with the predetermined or desired response field strength. Comparison assembly 28 of comparator 20 provides, at the output thereof, a logical signal 59, for example, indicating whether the measured current value $I_R$ is above or below current threshold value 55. According to embodiments of the present invention, this logical signal 59 may cause deactivator 22 to deactivate or change a data communication or CPU functionality of transponder 50 if the measured current $I_R$ is below current threshold value 55. Equally, the data communication or CPU functionality may be changed or activated if the measured current value $I_R$ is above current target value 55.

Here, too, current target value 55 is programmable according to a calibration.

Further embodiments also provide combinations of forms of embodiments described in the foregoing. That is, quantity 19 derived from the field strength may be a mixture of clock frequency $f_{CLK}$, the electrical conductance of load circuit 16, and current $I_R$ not consumed, for example.

Thus, embodiments of the present invention provide a concept for operating a transponder with determining a quantity which is derivable from a field strength of an electromagnetic field prevailing at the location of the transponder, comparing the determined quantity derived from the field strength with a threshold value, and for changing, disabling or limiting or enabling a data communication or CPU functionality of the transponder in the case of following below or exceeding the threshold value.

In embodiments, the determination includes detecting a residual power signal depending upon part of the energy provided by the electromagnetic field that is not needed by the load circuit of the transponder. In particular, current not consumed by the load circuit is detected, which depends upon the part of the provided energy that is not needed.

In some embodiments, the current not consumed is compared to a current threshold value, and in the case of the detected current not consumed falling below the current threshold value, a transmitting functionality of the transponder is deactivated.

In other embodiments, the load circuit is a clocked load circuit, and a clock frequency $f_{CLK}$ of a clock signal that depends on the prevailing field strength is determined for the load circuit by means of the residual power signal. The electrical power consumption of the load circuit may be adjusted by applying the clock signal with the dependent clock frequency $f_{CLK}$ determined according to the prevailing field strength. The determination of the clock frequency $f_{CLK}$ includes comparing a target value with the residual power signal detected to increase the clock frequency $f_{CLK}$ if the residual power signal detected is greater than the target value and to decrease the clock frequency $f_{CLK}$ if the residual power signal detected is smaller than the target value.

In still other embodiments, an electrical conductance of a load circuit clocked with a fixed clock frequency, with which an electrical power consumption of the load circuit may be adapted to the part of the energy provided by the electromagnetic field that is not needed, is determined by means of the residual power signal. The determination of the electrical conductance or of a quantity derived therefrom includes comparing a target value with the detected residual power signal to increase the electrical conductance of the load circuit if the detected residual power signal is greater than the target value, and to decrease the electrical conductance of the load circuit if the detected residual power signal is smaller than the target value.

Thus, embodiments of the present invention may achieve that a chip card, for example, fully functions only from a certain field strength, a desired programmable response field strength, and not below. The response field strength of the chip card thus may be predetermined by a programmable threshold value. By additional current sinks/consumers (static or frequency-dependent), a desired adjustment range of the response field strength may be varied. With small hardware expense, it is possible to automatically trigger an event (reset or interrupt) upon reaching a lower threshold of a quantity 19 derived from a field strength prevailing at the location of the transponder, so as to limit or enable functionality of the transponder, in particular, a data communication or CPU functionality.

In particular, it should be understood that depending on the circumstances, inventive methods for operating a transponder may also be implemented in software. Implementation may occur on a digital storage medium, in particular a disc, a DVD or a CD with electronically readable control signals which can interact with a programmable computer system such that the respective method is executed. Generally, the invention thus also consists in a computer program product with a program code stored on a machine-readable carrier for performing the inventive method, when the computer program product runs on a PC and/or a microcontroller. In other words, the invention may thus be realized as a computer program with a program code for performing the method when, the computer program runs on a computer and/or a microcontroller.

The invention claimed is:

1. An RFID transponder having an adjustable response field strength, comprising:
   a determination circuit formed to determine a quantity which is derivable from a field strength of an electromagnetic field prevailing at the location of the RFID transponder;
   a comparator formed to compare the determined quantity derived from the field strength with a threshold value, wherein the threshold value is based on the adjustable response field strength, which is hither than the minimum field strength required for the operation of the RFID transponder; and
   a deactivator formed to deactivate a functionality of the RFID transponder if the derived quantity falls below the threshold value.

2. The RFID transponder according to claim 1, wherein the deactivator is formed to deactivate a data communication functionality and/or a CPU functionality of the RFID transponder if the derived quantity falls below the threshold value.

3. The RFID transponder according to claim 1, further comprising an energy load circuit, and wherein the determination circuit includes a measurement circuit to detect a residual power signal depending upon part of the energy provided by the electromagnetic field that is not needed by the energy load circuit.

4. The RFID transponder according to claim 3, wherein the measurement circuit is formed to determine a current that is not consumed by the energy load circuit and that depends on the part of the provided energy that is not needed.

5. The RFID transponder according to claim 4, wherein the comparator is further formed to compare the detected current not consumed with a threshold value.

6. The RFID transponder according to claim 5, wherein the deactivator is further formed to deactivate a data communication functionality of the RFID transponder if the detected current not consumed falls below the target current value.

7. The RFID transponder according to claim 3, wherein the energy load circuit is a clocked energy load circuit, and wherein the determination circuit is further formed to determine, for the energy load circuit, a clock frequency of a clock signal that depends upon the prevailing field strength by means of the residual power signal.

8. The RFID transponder according to claim 7, wherein an electrical power consumption of the energy load circuit may be adjusted to the prevailing field strength by applying the clock signal with the dependent clock frequency determined to the energy load circuit.

9. The RFID transponder according to claim 7, wherein the determination circuit includes a comparator assembly formed to compare a target value with the determined residual power signal and to increase the clock frequency if the detected residual power signal is greater than the target value, and to decrease the clock frequency if the detected residual power signal is smaller than the target value, based on the comparison.

10. The RFID transponder according to claim 3, wherein the determination circuit is further formed to determine, by means of the residual power signal, an electrical conductance of the energy load circuit with which an electrical power consumption of the energy load circuit may be adapted to the part of the energy provided by the electromagnetic field that is not needed.

11. The RFID transponder according to claim 10, wherein an electrical power consumption of the energy load circuit is adapted to the part of the energy provided by the electromagnetic field that is not needed by adjusting the determined electrical conductance of the energy load circuit.

12. The RFID transponder according to claim 10, wherein the determination circuit includes a comparison assembly formed to compare a target value with the detected residual power signal to increase the electrical conductance of the energy load circuit if the detected residual power signal is greater than the target value, and to decrease the electrical conductance of the energy load circuit if the detected residual power signal is smaller than the target value, based on the comparison.

13. The RFID transponder according to claim 3, wherein the determined current drains off via a voltage limiting circuit, wherein the voltage limiting circuit is formed to regulate a voltage across it such that the voltage does not exceed a predetermined value.

14. The RFID transponder according to claim 13, wherein the voltage limiting circuit is formed as a shunt.

15. The RFID transponder according to claim 1, wherein the threshold value is programmable.

16. The RFID transponder according to claim 1, wherein the deactivator is further formed to deactivate a data communication functionality of the RFID transponder if the quantity derived is smaller than the threshold value.

17. An RFID transponder having an adjustable response field strength, comprising:
   a clock signal generator formed to be controllable depending upon a field strength of an electromagnetic field prevailing at the location of the RFID transponder so that a clock frequency of a clock signal generated by the clock signal generator depends upon the field strength at the location of the RFID transponder; and
   a comparator circuitry formed to compare a signal derived from the clock frequency with a threshold value and to limit or enable a functionality of the RFID transponder, based on a comparison result, wherein the threshold value is based on the adjustable response field strength, which is higher than the minimum field strength required for the operation of the RFID transponder.

18. The RFID transponder according to claim 17, wherein the clock signal is supplied to an energy load circuit in the RFID transponder so that electrical power consumption of the energy load circuit depends upon the clock frequency of the clock signal.

19. The RFID transponder according to claim 18, wherein the clock signal generator is further formed to be controllable by means of a current which depends upon part of an energy provided by the electromagnetic field that is not needed by the energy load circuit.

20. The RFID transponder according to claim 17, wherein the comparator circuitry is further formed to deactivate data communication functionality of the RFID transponder if the signal derived is smaller than the threshold value.

21. An RFID transponder having an adjustable response field strength, comprising:
   an energy load circuit with an electrical conductance that is adjustable depending upon a field strength of an electromagnetic field prevailing at the location of the RFID transponder; and
   a comparator circuitry formed to compare a signal derived from an adjusted electrical conductance with a threshold value and to limit or enable a functionality of the RFID transponder, based on a comparison result, wherein the threshold value is based on the adjustable response field strength, which is higher than the minimum field strength required for the operation of the RFID transponder.

22. The RFID transponder according to claim 21, wherein the electrical conductance is controllable by means of a current depending upon the part of energy provided by the electromagnetic field that is not needed by the energy load circuit.

23. A method for operating an RFID transponder, comprising:
   determining a quantity which is derivable from a field strength of an electromagnetic field that is prevailing at the location of the RFID transponder;
   comparing the determined quantity derived with a threshold value; and
   deactivating a functionality of the RFID transponder if the quantity derived falls below the threshold value, wherein the threshold value is based on the adjustable response field strength, which is higher than the minimum field strength required for the operation of the RFID transponder.

24. The method according to claim 23, wherein the determining the quantity includes determining a clock frequency of a clock signal for an energy load circuit of the RFID transponder, the clock frequency depending upon the prevailing field strength by means of the residual power signal.

25. A computer program for performing a method for operating an RFID transponder, the method comprising:
   determining a quantity which is derivable from a field strength of an electromagnetic field that is prevailing at the location of the RFID transponder;
   comparing the determined quantity derived with a threshold value; and
   deactivating a functionality of the RFID transponder if the quantity derived falls below the threshold value, wherein the threshold value is based on the adjustable response field strength, which is higher than the minimum field strength required for the operation of the RFID transponder,
   when the computer program runs on a computer and/or a microcontroller.

26. A transponder comprising:
   a determination circuit formed to determine a quantity which is derivable from a field strength of an electromagnetic field prevailing at the location of the transponder;
   a comparator formed to compare the determined quantity derived from the field strength with a threshold value;
   a deactivator formed to deactivate a functionality of the transponder if the derived quantity falls below the threshold value; and
   a load circuit, and in which the determination circuit includes a measurement circuit to detect a residual power signal depending upon part of the energy provided by the electromagnetic field that is not needed by the load circuit,
   wherein the load circuit is a clocked load circuit, and wherein the determination circuit is formed to determine, for the load circuit, a clock frequency of a clock signal that depends upon the prevailing field strength by means of the residual power signal, and
   wherein the determination circuit includes a comparator assembly to compare a target value with the determined residual power signal and to increase the clock frequency if the detected residual power signal is greater than the target value, and to decrease the clock frequency if the detected residual power signal is smaller than the target value, based on the comparison.

27. A transponder comprising:
   a determination circuit formed to determine a quantity which is derivable from a field strength of an electromagnetic field prevailing at the location of the transponder;
   a comparator formed to compare the determined quantity derived from the field strength with a threshold value;
   a deactivator formed to deactivate a functionality of the RFID transponder if the derived quantity falls below the threshold value; and
   a load circuit, and in which the determination circuit includes a measurement circuit to detect a residual power signal depending upon part of the energy provided by the electromagnetic field that is not needed by the load circuit,
   wherein the determination means is formed to determine, by means of the residual power signal, an electrical conductance of the load circuit with which an electrical power consumption of the load circuit may be adapted to the part of the energy provided by the electromagnetic field that is not needed, and
   wherein the determination circuit includes a comparison assembly to compare a target value with the detected residual power signal to increase the electrical conductance of the load circuit if the detected residual power signal is greater than the target value, and to decrease the electrical conductance of the load circuit if the detected residual power signal is smaller than the target value, based on the comparison.

* * * * *